US010355919B2

(12) United States Patent
Hulquest et al.

(10) Patent No.: US 10,355,919 B2
(45) Date of Patent: Jul. 16, 2019

(54) MOBILE STORAGE CONFIGURATION

(71) Applicant: NetApp, Inc., Sunnyvale, CA (US)

(72) Inventors: Kevin Michael Hulquest, Boulder, CO (US); Brian David Mason, Hillsboro, CO (US)

(73) Assignee: NETAPP, INC., Sunnyvale, CA (US)

( * ) Notice: Subject to any disclaimer, the term of this patent is extended or adjusted under 35 U.S.C. 154(b) by 333 days.

(21) Appl. No.: 15/010,702

(22) Filed: Jan. 29, 2016

(65) Prior Publication Data

US 2017/0222870 A1   Aug. 3, 2017

(51) Int. Cl.
H04L 12/24   (2006.01)
H04L 29/08   (2006.01)
H04L 29/12   (2006.01)

(52) U.S. Cl.
CPC ...... *H04L 41/0803* (2013.01); *H04L 67/1097* (2013.01); *H04L 41/22* (2013.01); *H04L 61/20* (2013.01)

(58) Field of Classification Search
CPC ..... H04W 4/008; H04W 4/001; H04W 84/18; H04B 5/0025; H04B 5/0062; G06Q 20/3278; H04M 1/7253; H04M 2250/04; H04N 2201/006; H04L 41/0803; H04L 41/22; H04L 61/20; H04L 67/1097
USPC ........................................................ 709/220
See application file for complete search history.

(56) References Cited

U.S. PATENT DOCUMENTS

| | | | |
|---|---|---|---|
| 8,527,987 B2* | 9/2013 | Johansson | G06F 8/61 455/41.1 |
| 9,727,879 B2* | 8/2017 | Suomela | G06Q 30/02 |
| 2009/0052664 A1* | 2/2009 | Goodman | G06F 21/6209 380/44 |
| 2012/0322411 A1* | 12/2012 | Lazarev | H04W 12/06 455/411 |
| 2014/0148096 A1* | 5/2014 | Bhatnagar | G09F 27/00 455/41.1 |
| 2015/0254677 A1* | 9/2015 | Huxham | G06K 19/0709 705/57 |
| 2015/0332043 A1* | 11/2015 | Russello | G06F 11/30 726/23 |
| 2016/0080166 A1* | 3/2016 | Chen | H04L 12/2827 700/276 |
| 2016/0173609 A1* | 6/2016 | Schmerler | H04W 4/02 709/203 |

* cited by examiner

*Primary Examiner* — Davoud A Zand
(74) *Attorney, Agent, or Firm* — Haynes and Boone, LLP

(57) ABSTRACT

A method, non-transitory machine readable medium, and system are provided for configuring a storage device. In some embodiments, the method includes establishing, by a storage system, a near field communication (NFC) session with a mobile device. A first set of identifiers is sent from the storage system to the mobile device via the NFC session. The first set of identifiers is modified at the mobile device. The mobile device sends the modified set of identifiers to the storage system. The modified set of identifiers is then assigned to the storage system.

26 Claims, 4 Drawing Sheets

MOBILE STORAGE CONFIGURATION

TECHNICAL FIELD

The present description relates generally to data storage, and more specifically, to systems, methods, and machine-readable media for configuring a storage device.

BACKGROUND

Networks and distributed data storage allow data and storage space to be shared between devices located anywhere a connection is available. Implementations may range from a single machine offering a shared drive over a home network to an enterprise-class cloud storage array with multiple copies of data distributed throughout the world. Larger implementations may incorporate Network Attached Storage (NAS) devices, Storage Area Network (SAN) devices, and other configurations of storage devices in order to provide data and manage its distribution.

Storage devices may be configured for network access in many ways. However, traditional techniques are complicated and may require much time and effort. For example, conventional storage device configuration techniques require at least some manual configuration. Users may be required to connect a storage device to a management computer via a serial cable to configure the storage device. This may require configuring the management computer to access the storage device via the serial cable, connecting to the storage device via the serial cable, performing a login process, and navigating through various interfaces on the management computer to input various parameters to configure the storage device. These tasks may be time intensive and not user-friendly.

While these techniques are generally adequate for configuring storage devices, they are an inefficient use of user time and may result in incomplete or faulty storage device configurations. Accordingly, techniques that allow for a more user-friendly configuration of storage devices would provide numerous advantages. For example, user efficiency may be improved and configuration errors may be reduced. Thus, while existing storage device configuration techniques have been generally adequate, limitations remain.

BRIEF DESCRIPTION OF THE DRAWINGS

The present disclosure is best understood from the following detailed description when read with the accompanying figures.

DETAILED DESCRIPTION

Figure 1:
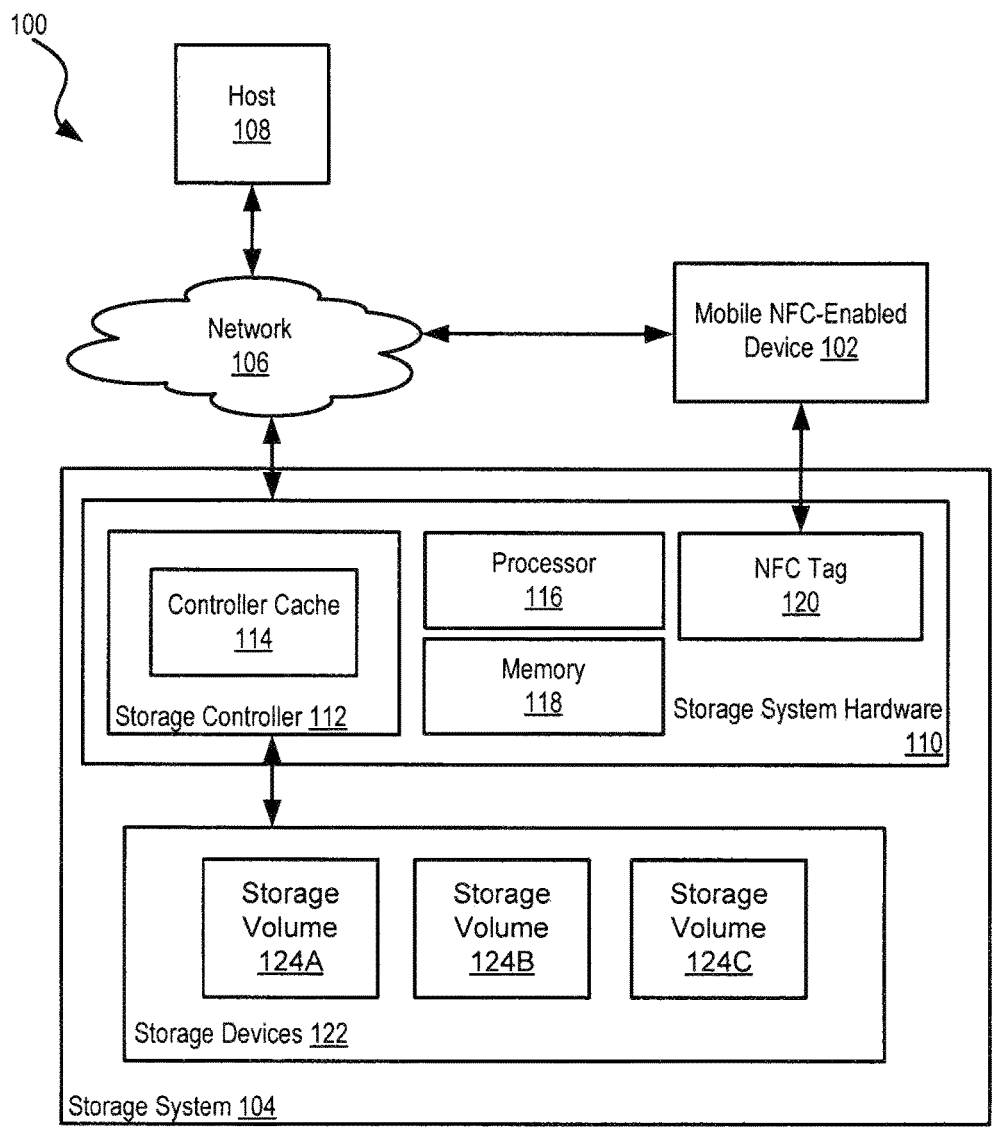
FIG. 1 is an organizational diagram of a data storage architecture, according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for configuring storage devices. In an example embodiment, a near field communication (NFC) tag is included on a storage system. The NFC tag stores identifiers to help configure a storage device. Identifiers may include one or more default internet protocol (IP) addresses, a serial number, an operating system version, and a human-readable name (also referred to as a friendly name).

A mobile device is configured to retrieve the identifiers (e.g., the default IP address(es), serial number, operating system version, and human-readable name) from the NFC tag when the mobile device is placed within a proximity threshold of the NFC tag of the storage system. For example, a user may physically contact the NFC tag with the mobile device (e.g., tapping the mobile device to the tag) to retrieve the identifiers. The mobile device may be configured to receive these identifiers by an application that is downloaded from an application repository.

The identifiers are displayed in one or more fields of the, application. The user may edit the fields to modify the identifiers. For example, the user may modify the default IP address(es) that are assigned to the storage system and the human-readable name assigned to the storage system.

In some examples, the modified identifiers entered in the fields of the application on the mobile device may be transferred to the storage system by placing the mobile device within the proximity threshold of the NFC tag. The storage system receives, from the NFC tag, the modified identifiers that were communicated to the NFC tag by the mobile device. In other examples, the mobile device uses the identifiers received from the storage system, such as the default IP address(es), to access the storage system via a Wi-Fi connection or other network connection. The mobile device may then transmit the modified identifiers to the storage system via the Wi-Fi or other network connection.

The modified identifiers are received by the storage system and processed to apply the modified identifiers to the storage system. For example, the modified IP addresses and/or human-readable name received from the mobile device may be applied to the storage system. The storage system may then be accessed according to the one or more IP addresses received from the mobile device. The storage system may also appear on a network as having the human-readable name received from the mobile device.

In some examples, once the storage system is configured with the modified identifiers, the NFC tag may also be updated to include the modified identifiers. The NFC tag may then provide the modified identifiers to the mobile device or other mobile devices that are placed within the proximity threshold of the NFC tag. These modified identifiers may be further updated by the mobile device and/or other mobile devices to re-configure the IP address(es) and/or human-readable name.

In some embodiments, the NFC tag is also used to communicate other information from the storage system to the mobile device. For example, the NFC tag may communicate an instruction manual from the storage system to the mobile device. In another example, the NFC tag may provide a hyperlink or other link to a location where the mobile device may access and/or download an instruction manual. The instruction manual may include instructions for connecting cables to the storage system, configuring automated support features, performing product registration, and so forth. In addition, information such as health of the storage system and performance statistics may be communicated from the storage system to the mobile device via the NFC tag or via a Wi-Fi network or other network connection between the mobile device and the storage system.

A data storage architecture 100, in which various embodiments may be implemented, is described with reference to FIG. 1.

The storage architecture 100 includes a host 108 that is structured as a computing device, such as a desktop computer, laptop computer, handheld/mobile computing device, rack mount server, or other computing device. In other examples, there may be additional hosts.

The host 108 is structured to communicate I/O requests to a storage system 104 to perform data transactions at the storage system 104. For example, the host 108 may request that data be written to and/or retrieved from the storage system 104. The storage system 104 is structured to receive the I/O requests from the host 108 via a network 106 and to perform data transactions (e.g., requests to read and/or write data) responsive to the I/O requests. In some examples, the storage system 104 returns responses to the host 108 corresponding to I/O requests that include requested data and/or status indictors regarding results of the I/O requests.

The storage system 104 is structured as a computing device, such as a rack mount server, desktop computer, laptop computer, or other computing device. The storage system 104 may include a single computing device or multiple computing devices that are communicatively coupled, such as via the network 106. In some examples, the storage system 104 is a storage server.

In the present example, the storage system 104 is communicatively coupled to the host 108 via the network 106. The network 106 may include one or more sub-networks. The network 106 may include any combination of public and/or private networks. The network 106 may include one or more network devices and transport media that are communicatively coupled via transport media. For example, network devices may include routers, hubs, switches, and so forth. Transport media may include, for example, Ethernet cable, Fibre Channel Cable, wireless signals, and so forth.

In the present example, a mobile NFC-enabled device 102 may also be communicatively coupled to the network 106 and may perform actions such as downloading a storage system, configuration utility from an application provider via the network 106.

It is understood that for clarity and ease of explanation, a single mobile NFC-enabled device 102, a single storage system 104, and a single host 108 are illustrated in the present example, although in other examples any number of mobile NFC-enabled devices, storage systems, and/or hosts may be included in the storage architecture 100. For example, during configuration of the storage system 104, a single storage system 104 may be communicatively coupled to a single mobile NFC-enabled device, without the storage system 104 being communicatively coupled to the host 108. Once the storage system 104 is configured by the mobile NFC-enabled device 102, one or more hosts may be communicatively coupled to the storage system 104 in the storage architecture 100.

The storage system 104 includes storage system hardware 110 and one or more storage devices 122. The storage system hardware 110 includes a storage controller 112 that is structured to exercise low-level control over the storage devices 122 in order to execute instructions to perform the data transactions of the storage system 104. In some examples, the storage system 104 includes a plurality of storage controllers. Having at least two storage controllers may be useful, for example, for failover and load balancing purposes in the event of equipment failure of either storage controller. Additional storage controllers may be structured to include similar components to those described with respect to storage controller 112. Each storage controller may be configured with a unique address to provide access to each storage controller via the network 106.

In the present example, the storage controller 112 is structured with a controller cache 114, Data corresponding to the storage devices 122 may be temporarily stored in the controller cache 114 of the storage controller 112 to allow faster access to the data by the host 108 and/or storage system 104 than would be provided by accessing the data from the storage devices 122. The controller cache 114 may provide faster access to the data than the storage devices 122 by including faster memory and/or by including other mechanisms that expedite transaction processing. The controller cache 114 may include any volatile or non-volatile storage medium, but common examples of controller cache 114 memory may include resistive RAM (RRAM), phase-change RAM (PCRAM), flash memory (e.g., NAND/NOR flash memory), battery-backed DRAM, and so forth.

The storage system hardware 110 is structured with a processor 116, a memory 118 and an NFC tag 120. The processor 116 is communicatively coupled to the storage controller 112, memory 118 and NFC tag 120, such as via one or more buses that may be provided by any combination or wired and/or wireless technology. The processor 116 is structured as at least one microcontroller or a central processing unit (CPU) operable to execute instructions that are stored in the memory 118 to perform I/O operations.

The memory 118 may be structured as one or more of a random access memory (RAM); a non-transitory computer-readable storage medium such as a magnetic hard disk drive (HDD), a solid-state drive (SSD), or an optical memory (e.g., CD-ROM, DVD, BD), The instructions stored in the memory 118, when executed by the processor 116, cause the storage system 104 to perform various operations as described herein.

Instructions may also be referred to as code. The terms "instructions" and "code" should be interpreted broadly to include any type of computer-readable, statement(s). For example, the terms "instructions" and "code" may refer to one or more software applications, programs, routines, subroutines, functions, procedures, etc. "Instructions" and "code" may include a single computer-readable statement or many computer-readable statements.

The storage architecture 100 includes storage devices 122. The storage devices 122 are structured to include one or more storage devices that may include hard disk drives (HDDs), solid state drives (SSDs), optical drives, and/or any other suitable volatile or non-volatile data storage medium. In some embodiments, the storage devices are relatively homogeneous (e.g., having the same manufacturer, model, and/or configuration). However, in other examples, the storage devices 122 include a heterogeneous set of storage devices, such as storage devices of different media types from different manufacturers with notably different performance. In some examples, these storage devices 122 may be physically located internally and/or externally to a same case/box that includes the storage system hardware 110.

The storage system 104 may group storage devices 122 for speed and/or redundancy using a virtualization technique such as RAID (Redundant Array of Independent/Inexpensive Disks). At a high level, virtualization includes mapping physical addresses of the storage devices 122 into a virtual address space and presenting the virtual address space to the host 108. In this way, the storage system 104 represents the group of devices as a single device, often referred to as a volume. Thus, a host 108 can access the volume without concern for how it is distributed among the underlying storage devices 122. In the present example, the storage devices 122 include a plurality of volumes (e.g., storage volumes 124A, 124B, and 124C). In other examples, the storage devices 122 may include a single volume or a plurality of volumes.

Each storage volume may include data that may be accessed by storage controllers (e.g., storage controller 112) of the storage system 104 to perform data transactions on behalf of hosts (e.g., host 108). The data that is accessed from the storage volumes may be configured in a layout that includes storage stripes that include a plurality of data sectors. For example, a storage controller 112 may be structured to store data on the storage devices 122 using a data protection scheme such as RAID 1 (mirroring), RAID 5 (striping with parity), or RAID 6 (striping with double parity).

The NFC tag 120 of the storage system 104 is structured to provide a communicative coupling with the mobile NFC-enabled device 102. The NFC tag 120 of the storage system may communicate one or more identifiers between the mobile NFC-enabled device 102 and the storage system 104. In some examples, the NFC tag 120 is structured as a data store that may be read and/or written to by one or more NFC protocols. An example of a structure of an NFC tag 120 includes a compact antenna that is coupled to a memory that allows for short-range communication via one or more NFC protocols. NFC communication protocol standards that may be applicable to allow reading and/or writing to the NFC tag include. but are not limited to, the ECMA-340 and ECMA-352 standards that provide technical specification corresponding to the Near Field Communication Interface and Protocol (NFCIP-1) and the Near Field Communication Interface and Protocol-2 (NFCIP-2), respectively.

In some examples, NFC communications between the mobile NFC-enabled device 102 and the storage system 104 are referred to as occurring within an NFC session. An NFC session may be structured as a period of time that the mobile NFC-enabled device 102 communicates with the storage system 104 via one or more NFC communications. This period of time may include interrupted or non-interrupted NFC communications. For example, tapping the mobile NFC-enabled device 102 to the NFC tag 120 of the storage system 104 to receive an identifier of the storage system 104 may be an NFC session. As another example, placing the mobile NFC-enabled device 102 within a communication range of the NFC tag 120 of the storage system 104 to communicate an identifier from the mobile NFC-enabled device 102 to the storage system 104 may be an NFC session. An NFC session may include both the above receiving of the identifier at the mobile NFC-enabled device 102 from the storage system 104 as well as the communicating of the identifier from the mobile NFC-enabled device 102 to the storage system 104.

As identified above, it is not required that the mobile NFC-enabled device 102 be communicatively coupled to the NFC tag of the storage system 104 for the duration of the NFC session. The NFC session also include one or more time portions where the mobile NFC-enabled device 102 is communicatively coupled to the storage system 104 and one or more time portions where the mobile NFC-enabled device is not communicatively coupled to the storage system 104.

In more detail, an NFC session may be structured as a first set of NFC communications being sent from the storage system 104 to the mobile NFC-enabled device 102, an editing of the information received on the mobile NFC-enabled device 102, and a second set of NFC communications being received at the storage system 104 from the mobile NFC-enabled device 102.

In some examples, the mobile NFC-enabled device 102 is structured to initiate an NFC session by placing the mobile NFC-enabled device 102 within a proximity threshold of the storage system 104. The mobile NFC-enabled device may be structured to communicate with the storage system 104 during the NFC session by generating a magnetic field that induces electricity in the NFC tag 120 of the storage system 104. The magnetic field may be structured to generate an electromagnetic field between the mobile device and the NFC tag 120 that is used to transmit information, such as identifiers corresponding to one or more IP addresses, server names, server serial numbers, and/or other information between the mobile NFC-enabled device 102 and the storage system 104.

The storage architecture 100 includes the mobile NFC-enabled device 102. The mobile NFC-enabled device is structured as a portable device, such as a smart phone, personal digital assistant (PDA), tablet, laptop, or other mobile device. The mobile NFC-enabled device 102 is structured with a near field communication (NFC) transmitter and/or reader that transmits information and/or receives information via one or more NFC communication protocols. In the present example, the mobile NFC-enabled device 102 is structured to receive information from a storage system 104 and transmit information to the storage system 104 via the one or more NFC communication protocols.

The mobile NFC-enabled device 102 and storage system 104 are structured to be communicatively coupled via NFC technology to communicate information. The information communicated may include identifiers corresponding to one or more network addresses (e.g., IP addresses, domain names, network masks, gateways, and so forth) of the storage system 104, a serial number of the storage system 104, the operating system and operating system version of the storage system 104, and a human-readable (friendly) name of the storage system 104. In the present example, the storage system 104 is structured to communicate the one or more identifiers to the mobile NFC-enabled device 102.

The mobile NFC-enabled device 102 is structured to receive the one or more identifiers from the storage system 104 and to display the one or more identifiers in a GUI and/or CLI provided by the mobile NFC-enabled device 102. In some examples, the GUI/CLI is provided by executing instructions of an application that is downloaded via the network 106 and installed on the mobile NFC-enabled device 102. The mobile NFC-enabled device 102 is also structured to modify the received one or more identifiers, such as by executing instructions of the application. The mobile NFC-enabled device 102 is structured to communicate the one or more modified identifiers to the storage system 104 via, the communicative coupling provided by the NFC technology or via the network 106.

In addition to the one or more identifiers described above, the mobile NFC-enabled device 102 and storage system 104 may also be structured to communicate other information via the NFC communicative coupling or via the network 106. Examples of other information that the mobile NFC-enabled device 102 and the storage system 104 may be structured to communicate include storage system instruction manuals, storage system health information, storage system performance statistics, and/or any other information corresponding to storage system configuration.

Figure 2:
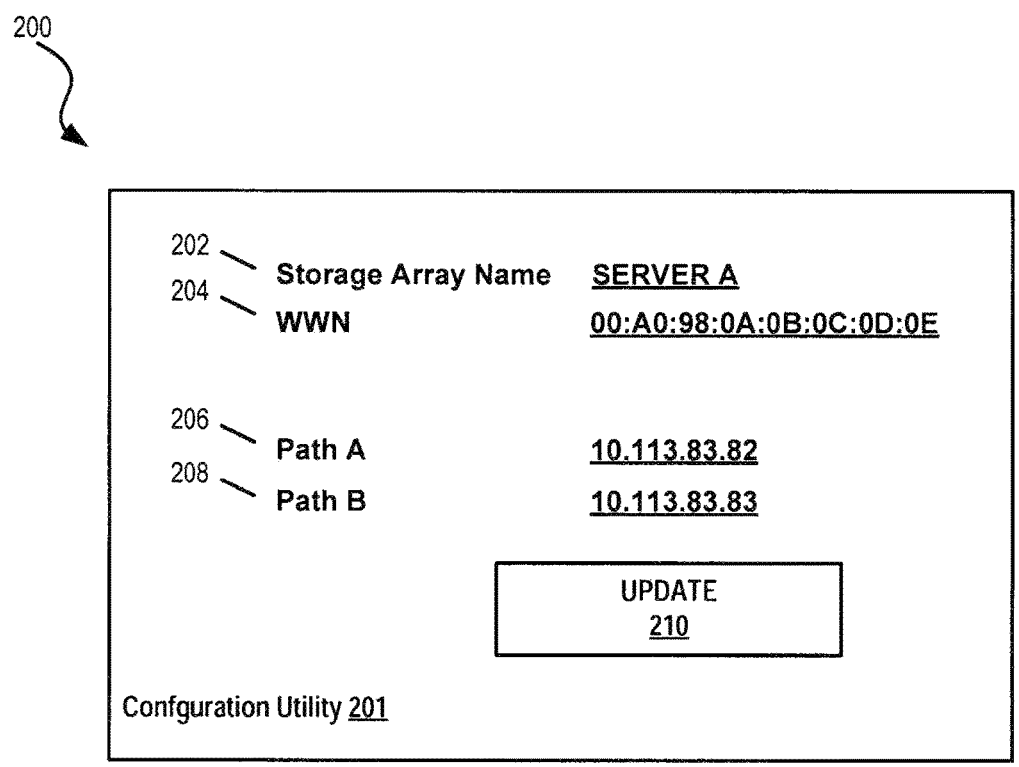
FIG. 2 is an organizational diagram of a display provided by a mobile device, according to aspects of the present disclosure.

FIG. 2 is an organizational diagram illustrating a display provided by a mobile device, according to aspects of the present disclosure. FIG. 2 illustrates an example of a GUI that may be presented on a mobile device (e.g., NFC-enabled device 102) that is configured to allow one or more users to configure a storage system (e.g., storage system 104). In some examples, the display is generated by a configuration utility 201 that is a program/software/application that is installed on the mobile device.

In the present example, the display 200 includes a storage array name identifier 202 that in this example is configured as "SERVER A." The storage array name identifier 202 may also be referred to as a human-readable name or friendly name. In some examples, the storage array name identifier 202 is provided by a storage system (e.g., storage system 104) to the mobile device and may be edited on the mobile device to update the storage array name identifier 202 in the storage system.

In the present example, the display 200 includes a World Wide Name (WWN) identifier 204 that in this example is configured as "00:A0:98:0A:0B:0C:0D:0E." The WWN identifier 202 may also be referred to as a World Wide Identifier (WWID) or a serial number corresponding to the storage system. In other examples, other serial numbers may also be displayed in the GUI instead of or in addition to the WWN identifier 202. In some examples, the WWN identifier 204 is provided by a storage system to the mobile device. In the present example the WWN identifier 204 is hard coded to the storage system and is therefore not modifiable. Accordingly, the mobile device may lock the WWN identifier 204 to prevent user editing of the WWN identifier 204.

In the present example, the display 200 includes Path A identifier 206 and a Path B identifier 208 that in this example are configured as "10.113.83.82" and "10.113.83.83," respectively. In some examples, each path may include an IP address, Domain Name, or other address corresponding to the storage system. In some examples, the path identifiers 206 and 208 are configured as default identifiers on the storage system and provided to the mobile device. These paths may be edited on the mobile device to update the addresses that are configured in the storage system. In some examples, there may be one path identifier, while in other examples there may be two or more path identifiers. For example, if the storage system includes two storage controllers, there may be a first path that is provided that corresponds to a network address of the first storage controller and a second path that is provided that corresponds to a network address of the second storage controller.

In the present example, the display 200 includes a button 210 or other display element that is configured to be selected to communicate changes to the identifiers to the storage system. In some example, after the button is selected by one or more users, when the mobile device is in range of an NFC tag of the storage system the identifiers may be transmitted to the storage system. In other examples, after the button is selected, the mobile device transmits the modified identifiers to the storage system via a Wi-Fi or other network connection. The mobile device may identify the storage system on the Wi-Fi network or other network based on the identifiers received from the NFC tag.

After the storage system receives the modified identifiers from the mobile device, the storage system may update its configuration based on the modified identifiers. For example, one or more default IP addresses of the storage system may be modified to include the IP addresses that were input via the GUI of the mobile device. These IP addresses may also be referred to as site specific IP addresses. Similarly, the friendly name of the storage system may be updated so that the storage system appears in the network as having the friendly name that was input via the GUI of the mobile device. Accordingly, the storage system is effectively bound to the site and ready for service duty at the site.

Figure 3:
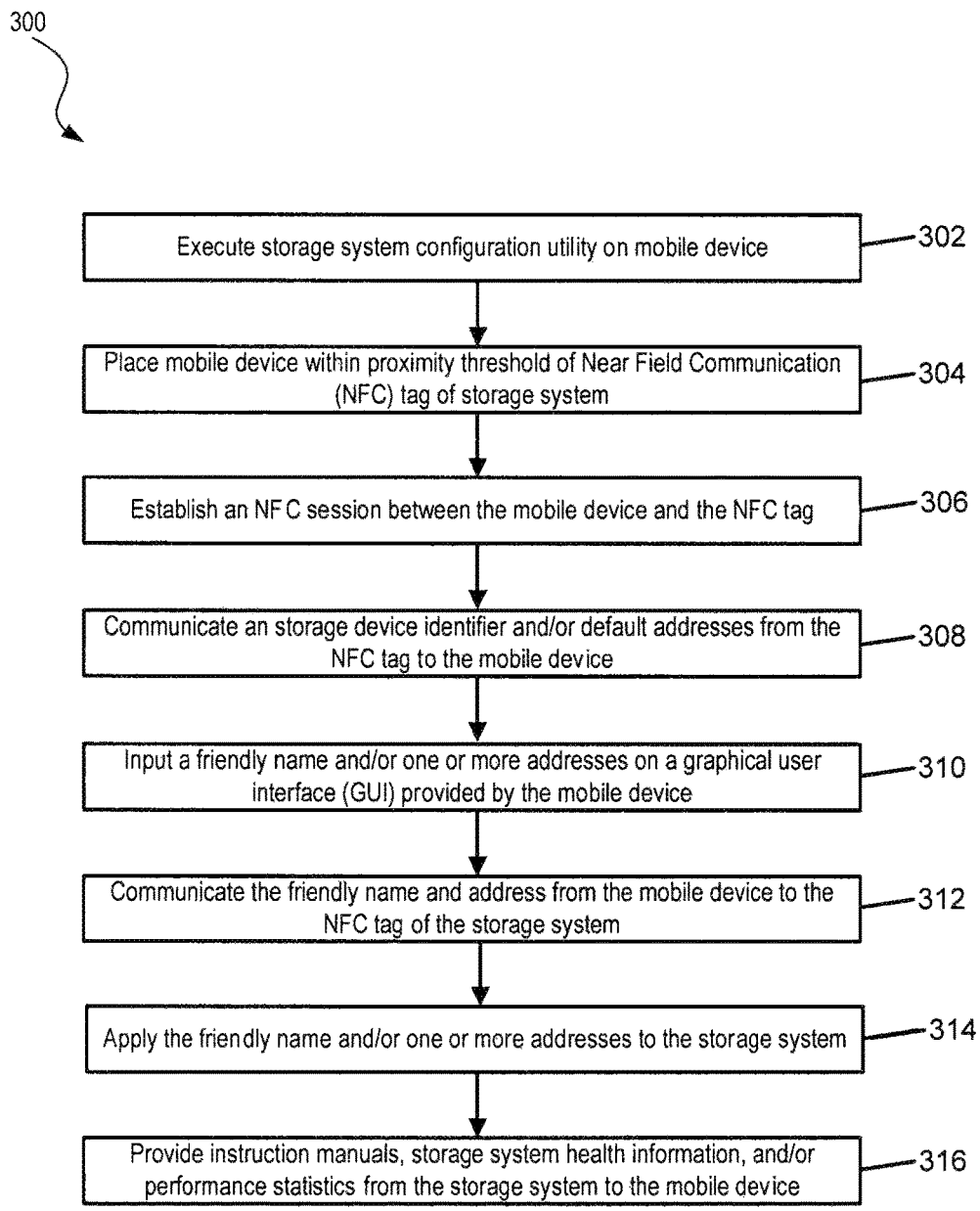
FIG. 3 is a flow diagram illustrating techniques for performing a storage device configuration, according to aspects of the present disclosure.

FIG. 3 is a flow diagram illustrating techniques for performing a storage device configuration, according to aspects of the present disclosure. In an embodiment, the method 300 may be implemented by one or more processors of the mobile NFC-enabled device 102 and one or more processors of the storage system 104, by executing computer-readable instructions to perform the functions described herein. It is understood that additional steps can be provided before, during, and after the steps of method 300, and that some of the steps described can be replaced or eliminated in other examples of the method 300.

At action 302, a mobile device executes a storage system configuration utility. In some examples, the storage system configuration utility is an application that is downloaded from an application repository and installed on the mobile device. The storage system configuration utility may present a GUI or other interface, such as a command line interface (CLI), so that a user may browse, display, and/or modify configuration parameters of a storage system.

At action 304, the mobile device is placed within a proximity threshold of a near field communication (NFC) tag of the storage system. In some examples, the proximity threshold is within approximately twenty centimeters. In other examples, the proximity threshold is within approximately ten centimeters. In yet other examples, the proximity threshold is physical contact between the mobile device with an NFC tag (e.g., tapping the mobile device to the NFC tag) of the storage system.

At action 306, an NFC session is established between the mobile device and the NFC tag of the storage system. In the present example, the NFC session is established by the mobile device generating a magnetic field that induces electricity in the NFC tag. Magnetic induction between the mobile device and the NFC tag creates an electromagnetic field between the mobile device and the NFC tag. The electromagnetic field communicatively couples the mobile device and the storage system, such that the mobile device and the storage system may communicate information via one or more NFC communication protocols.

An NFC session may comprise any communicative coupling between the mobile device and the storage system that uses one or more NFC communication protocols. Information may be communicated between the mobile device and the storage system in a single NFC session or in multiple NFC sessions. An NFC session may include any one or more communications between the mobile device and the storage system. Communications between the mobile device and the storage system may be included in the NFC session even if there are time periods during the session in which the mobile device is not communicatively coupled to the storage system. For example, a first set of communications sent from the storage system to the mobile device may be included in an NFC session with a second set of communications sent from the mobile device to the storage system even if the mobile device is temporarily removed from an NFC proximity threshold between the communicating of the first set of communications and the communicating of the second set of communications.

At action 308, during the NFC session the storage system communicates a first set of identifiers from its NFC tag to the mobile device. The identifiers in the first set of identifiers may include, for example, a storage device identifier and/or one or more default IP addresses. In some examples, the storage device identifier includes a serial number, such as a WWN that is assigned to the storage system. In the present example, the storage device identifier is a unique identifier that is reserved for the particular storage system.

In some examples, the default addresses includes one or more IP addresses that are assigned to the storage system. In other examples, the default addresses include one or more domain names or other network addresses corresponding to the storage system, instead of or in addition to the default IP addresses. Further, in some examples, the default addresses include an address for each storage controller of the storage system. For example, a storage system that includes two storage controllers may include a default address that is assigned to each storage controller. Accordingly, each default address may be communicated to the mobile device. In addition to IP addresses and domain names, other addresses may also be configured in the storage system and communicated to the mobile device. In some examples, address information communicated to the mobile device includes network mask and default gateway information.

The information communicated from the storage system to the mobile device is received at the mobile device and may be presented on a display of the mobile device. For example, the received identifiers may be output as one or more fields of a GUI provided by the mobile device. An example of a GUI that outputs the identifiers is provided in FIG. 2.

At action 310, a second set of identifiers may be input via the GUI provided by the mobile device. In some examples, the second set of identifiers includes a friendly name and/or one or more addresses that are input via the GUI. For example, the one or more default addresses received from the storage system may be presented via an editable field on the GUI so that a user may modify the one or more default addresses to include the one or more addresses. Accordingly, the user may enter site specific IP addresses corresponding to the storage system. The friendly name may be an alphanumeric value entered by a user that describes the storage system, such that a user may identify the storage system via a network. For example, the friendly name may describe a location, a description of the site and/or purpose associated with the storage system, or other information corresponding to the storage system that will uniquely identify the storage system to one or more users.

An example of a GUI that allows one or more users to edit and enter information in fields is provided in FIG. 2. While the one or more addresses are illustrated in FIG. 2 as IP addresses, in other examples the addresses may include domain names, network masks, gateways, and/or other addresses corresponding to the storage system.

In some examples, the mobile device is not within the proximity threshold while one or more users input and/or modify the identifiers. For example, the mobile device may be placed within a proximity threshold of the storage system to receive the identifiers from the storage system. The mobile device may be removed from the proximity threshold while the user modifies the identifiers. After the user modifies the identifiers the mobile device may be positioned back within the proximity threshold so that the identifiers may be communicated to the storage system. In the present example, these actions may all be included in an NFC session despite the mobile device being temporarily out of the proximity threshold for performing NFC communications. In, other examples, the mobile device may be placed within the proximity threshold for the duration of the performing of actions 308-312.

At action 312, the friendly name and/or one or more addresses are communicated from the mobile device to the storage system. These identifiers may be communicated via the NFC tag of the storage system or via a Wi-Fi network or other network connection.

In some examples, a user may select an enter/update button via the GUI and position the mobile device within a proximity threshold of the NFC tag of the storage system. Once the identifiers are received at the NFC tag, the storage system may read the identifiers from the NFC tag for processing. In other examples the mobile device may connect to the storage system via a Wi-Fi network or other network using the identifiers received from the NFC tag. Once the connection is established, the mobile device may transmit the friendly name and/or one or more addresses from the mobile device to the storage system via the connection.

At action 314, the storage system applies the received friendly name and/or addresses. For example, the storage system may modify IP addresses associated with its storage controllers to the received addresses that may be different than the default addresses. Accordingly, a first storage controller may be configured to receive information that is sent to a first assigned IP address and information that is sent from the first storage controller may be identified as originating from the first assigned IP address. Similarly, a second storage controller may be configured to receive information that is sent to a second assigned IP address and information that is sent from the second storage controller may be identified as originating from the second assigned IP address. In addition, other addresses used by the storage system for its network configuration may also be modified, such as network masks, gateways, and so forth.

Further, the storage system may modify one or more entries in the storage system with the friendly name, such that the friendly name is used to identify the storage system. Accordingly, network applications may identify the storage system in the network by the friendly name and/or addresses that are received from the mobile device. Thus, after the addresses are applied to the storage system, the storage system accessible at the addresses and/or friendly name for service duty.

At action 316, the storage system provides additional information to the mobile device. This additional information may be provided from the NFC tag of the storage system to the mobile device or via another network connection established between the mobile device and the storage system. Examples of additional information that may be provided to the mobile device include instruction manuals for configuring the storage system (or links to the instruction manuals), information corresponding to health of the storage system, and/or performance statistics corresponding to the storage system. In more detail, examples of performance statistics may include response times, processor load, memory usage, network latency, and so forth.

Figure 4:
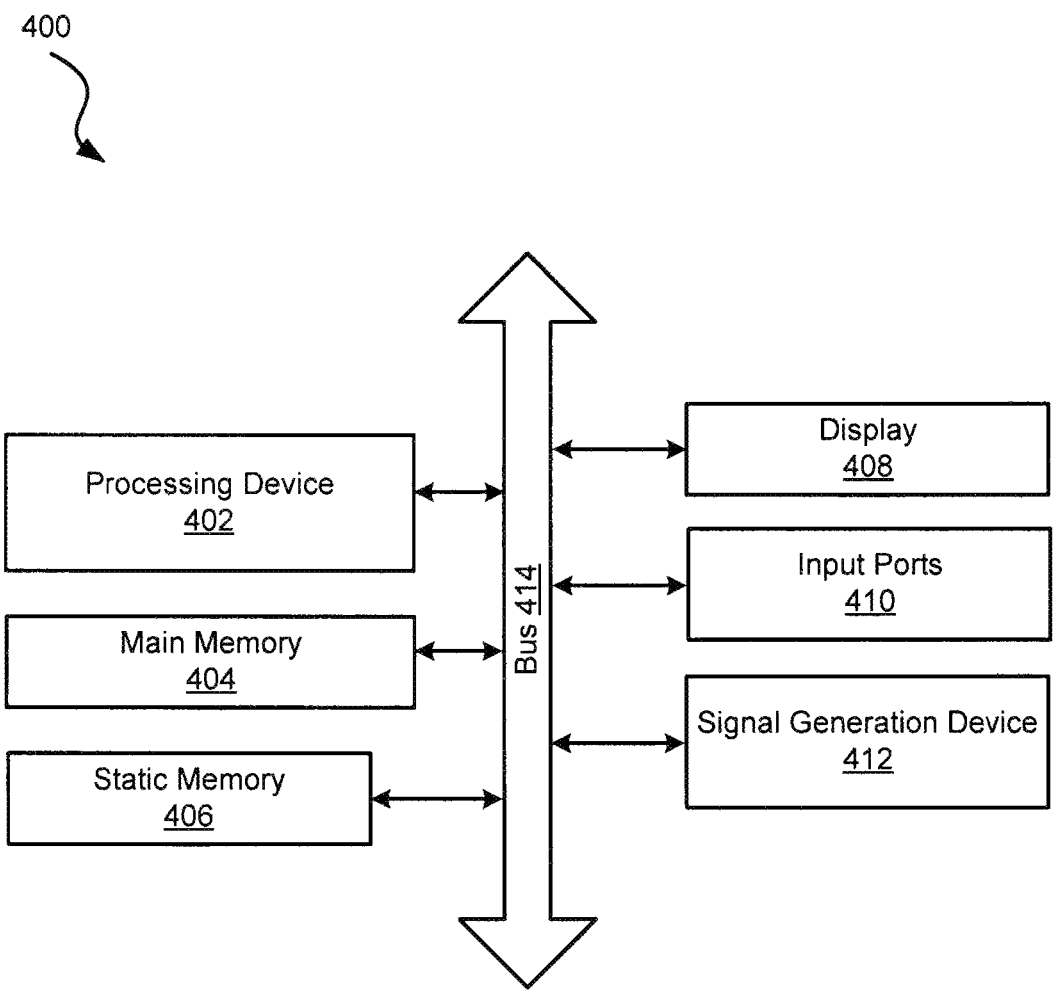
FIG. 4 is a schematic diagram of machine within which a set of instructions may be executed to cause the machine to perform any one or more of the methodologies discussed herein.

FIG. 4 illustrates a diagram of a machine in the form of a device 400 within which a set of instructions, for causing the machine to perform any one or more of the methodologies discussed herein, may be executed. For example, the mobile NFC-enabled device 102, storage system 104, and/or host 108 may include elements described with respect to FIG. 4. Further, while a single machine is illustrated, the term "machine" shall also be taken to include any collection of machines that individually or jointly execute a set (or multiple sets) of instructions to perform any one or more of the methodologies discussed herein.

Device 400 includes a processing device (e.g., a processor) 402, a main memory 404 (e.g., flash memory, read-only memory (ROM), dynamic random access memory (DRAM) such as synchronous DRAM (SDRAM), double data rate (DDR SDRAM), or DRAM (RDRAM), and so forth), and a static memory 406 (e.g., flash memory, static random access memory (SRAM), and so forth), which communicate with each other via bus 414.

Processing device 402 (e.g., processor 116) represents one or more general-purpose processing devices such as central processing units, microprocessors, and so forth. Processing device 402 may also be one or more special-purpose processing devices such as an application specific integrated circuit (ASIC), a field programmable gate array (FPGA), a digital signal processor (DSP), network processor, and so forth. Processing device 402 is configured to execute instructions for performing, the operations and steps discussed herein.

Static memory 406 may include a non-transitory computer-readable storage medium on which is stored one or more sets of instructions (e.g., software) embodying any one or more of the methodologies or functions described herein. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The instructions in the non-transitory computer readable, storage medium may also be stored, completely or at least partially, within main memory 404 and/or within processor 402 during execution thereof by computer system 400, main memory 404 and processor 402. While static memory 406 and main memory 404 are shown in an example to each be a single medium, the term "memory" should be taken to include a single memory medium or multiple memory media that store the one or more sets of instructions.

Device 400 also may include display 408 (e.g., LED, a liquid crystal display (LCD) or a cathode ray tube (CRT)), one or more input ports 410 (e.g, USB ports, serial or parallel interface ports, PCI interface, network ports, and so forth), and signal generation device 412 (e.g, a speaker, NFC tag/transmitter, and so forth). These devices may be communicatively coupled to bus 414 directly or through one or more intermediary components.

Input ports 410 may include one or more ports for receiving information from external components. For example, the input ports 410 may receive information from a network interface device and/or NFC tag, which is processed by processing device 402 to perform operations using the received information.

In some examples, signal generation device 412 is a separate component from device 400. In these examples that include a separate signal generation device, the device 400 is configured to include one or more ports to communicate with signal generation device 412.

While only one bus 414 is illustrated, bus 414 may represent one or more buses that communicatively couple components of the device 400. Further, while the illustration shows bus 414 as coupling all of the components, in other examples some components may be communicatively coupled to one another without being communicatively coupled to other components. For example, the signal generation device 412, input ports 410 and display 408 may not be directly communicatively coupled to one another, but rather may be communicatively coupled via another intermediary component, such as processing device 402.

As will be recognized, the method 300 provides an improved storage system configuration technique that addresses a technical challenge particular to networked storage systems. In some embodiments, this improved storage system configuration technique allows for a more user-friendly configuration of a storage system. For example, user efficiency may be improved and configuration errors may be reduced. The present technique addresses challenges provided by conventional storage system configuration techniques and thereby provides significant improvements over these conventional storage system configuration techniques.

In various embodiments, the improved storage system configuration technique is performed by using various combinations of dedicated, fixed function computing elements and programmable computing elements executing software instructions. Accordingly, it is understood that any of the steps of method 300 may be implemented by a computing system using corresponding instructions stored on or in a non-transitory computer readable medium accessible by the processing, system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and Random Access Memory (RAM).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   establishing, by a near field communication (NFC) device physically located at a storage system, an NFC session with a mobile device;
   sending, via the NFC session, a first set of identifiers from the storage system to the mobile device;
   receiving a second set of identifiers at the storage system from the mobile device, wherein the second set of identifiers is received from a graphical user interface application of the mobile device; and
   configuring the storage system for network access according to the second set of identifiers, including updating within the storage system a path identifier of a storage controller of the storage system, wherein the path identifier is received from the mobile device as one of the second set of identifiers.

2. The method of claim 1, wherein the first set of identifiers comprises an internet protocol (IP) address.

3. The method of claim 1, wherein the second set of identifiers comprises a domain name.

4. The method of claim 1, wherein the first set of identifiers comprises a World Wide Name (WWN).

5. The method of claim 1, further comprising:
providing, to the mobile device, an installation guide corresponding to the storage system.

6. The method of claim 1, wherein establishing the NFC session comprises:
inducing electricity in an NFC tag of the storage system to generate an electromagnetic field between the mobile device and the NFC tag, wherein the mobile device is within a proximity threshold of the NFC tag, and wherein the electricity is induced in the NFC tag by a magnetic field generated by the mobile device.

7. The method of claim 6, wherein the proximity threshold comprises a distance of less than ten centimeters.

8. The method of claim 6, further comprising:
communicating performance statistics from the storage system to the mobile device.

9. A non-transitory machine readable medium having stored thereon instructions for performing a method comprising machine executable code which when executed by at least one machine, causes the machine to:
establish, by a near field communication (NFC) device physically located at the machine, an NFC session with a mobile device, wherein the machine comprises a data storage system;
send, via the NFC session, a first set of identifiers to the mobile device;
receive a second set of identifiers from the mobile device, wherein the second set of identifiers is received from a graphical user interface of the mobile device; and
configure the data storage system for network access by replacing at least one storage controller path identifier of the first set of identifiers on the machine with at least one storage controller path identifier of the second set of identifiers.

10. The non-transitory machine readable medium of claim 9, wherein the second set of identifiers includes an internet protocol (IP) address.

11. The non-transitory machine readable medium of claim 9, wherein the second set of identifiers includes a domain name.

12. The non-transitory machine readable medium of claim 9, wherein the first set of identifiers includes a World Wide Name (WWN).

13. The non-transitory machine readable medium of claim 9, further comprising:
providing, to the mobile device, an installation guide corresponding to the machine.

14. The non-transitory machine readable medium of claim 9, wherein establishing the NFC session includes inducing electricity in an NFC tag of the machine to generate an electromagnetic field between the mobile device and the NFC tag, wherein the mobile device is within a proximity threshold of the NFC tag, and wherein the electricity is induced in the NFC tag by a magnetic field generated by the mobile device.

15. A computing device comprising:
a memory containing machine readable medium comprising machine executable code having stored thereon instructions for performing a method of configuring a computing system;
a processor coupled to the memory, the processor configured to execute the machine executable code to cause the processor to:
receive a set of identifiers from a mobile device,
wherein the set of identifiers is received from a graphical user interface of the mobile device and received by a data storage system, and
wherein at least one of the set of identifiers is modified from a previous set of identifiers received by the mobile device from an NFC tag of the computing system; and
provide network access to the computing system based on at least one network address included in the set of identifiers, including updating within the data storage system a path identifier of a storage controller of the data storage system, wherein the path identifier is received from the mobile device as one of the set of identifiers.

16. The computing device of claim 15, wherein the at least one network address comprises an internet protocol (IP) address.

17. The computing device of claim 15, wherein the at least one network address comprises a domain name address.

18. The computing device of claim 15, wherein the set of identifiers comprises a World Wide Name (WWN).

19. Original The computing device of claim 15, the NFC tag of the computing system further to:
provide, to the mold le device, access to an installation guide corresponding to the computing system.

20. The computing device of claim 15, further comprising a plurality of storage drives in communication with the storage controller, wherein the storage controller is configured to store data to the plurality of storage drives according to one or more Redundant Array of Independent Drives (RAID) levels.

21. A method comprising:
establishing a near field communication (NTT) session between a mobile device and a data storage system;
receiving, at the mobile device and via the NFC session, a first path identifier of a storage controller of the data storage system;
modifying the first path identifier into a second path identifier at the mobile device; and
transmitting the second path identifier from the mobile device to the data storage system, causing the data storage system to configure itself for network access according to the second path identifier.

22. The method of claim 21, further comprising:
modifying the path identifier in response to user input from a graphical user interface application of the mobile device.

23. The method of claim 21, wherein receiving the first path identifier comprises communicating with a NFC tag physically located at the data storage system.

24. The method of claim 21, further comprising:
receiving, by the mobile device and via the NFC session, an installation guide corresponding to the data storage system.

25. The method of claim 21, wherein transmitting the second path identifier to the data storage system comprises communicating the second path identifier from the mobile device to a NFC tag physically located at the data storage system.

26. The method of claim 21 wherein transmitting the second path identifier to the data storage system comprises communicating the second path identifier from the mobile device to the data storage system via Wi-Fi.

* * * * *